Sept. 27, 1932.　　　W. D. BAYLEY　　　1,879,781
FARROWING HOUSE
Filed Jan. 3, 1928　　　3 Sheets-Sheet 1
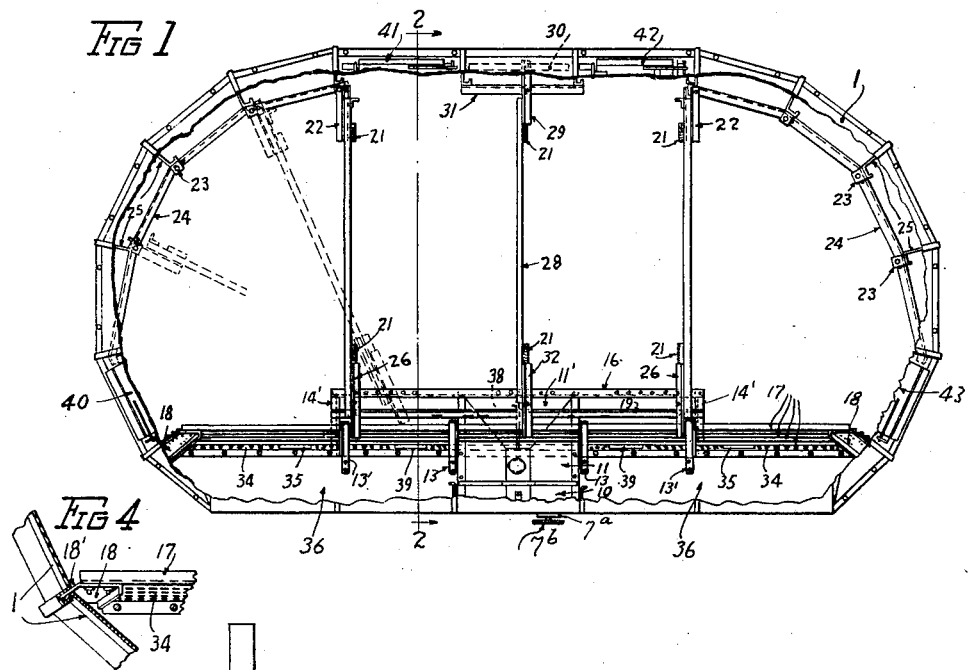
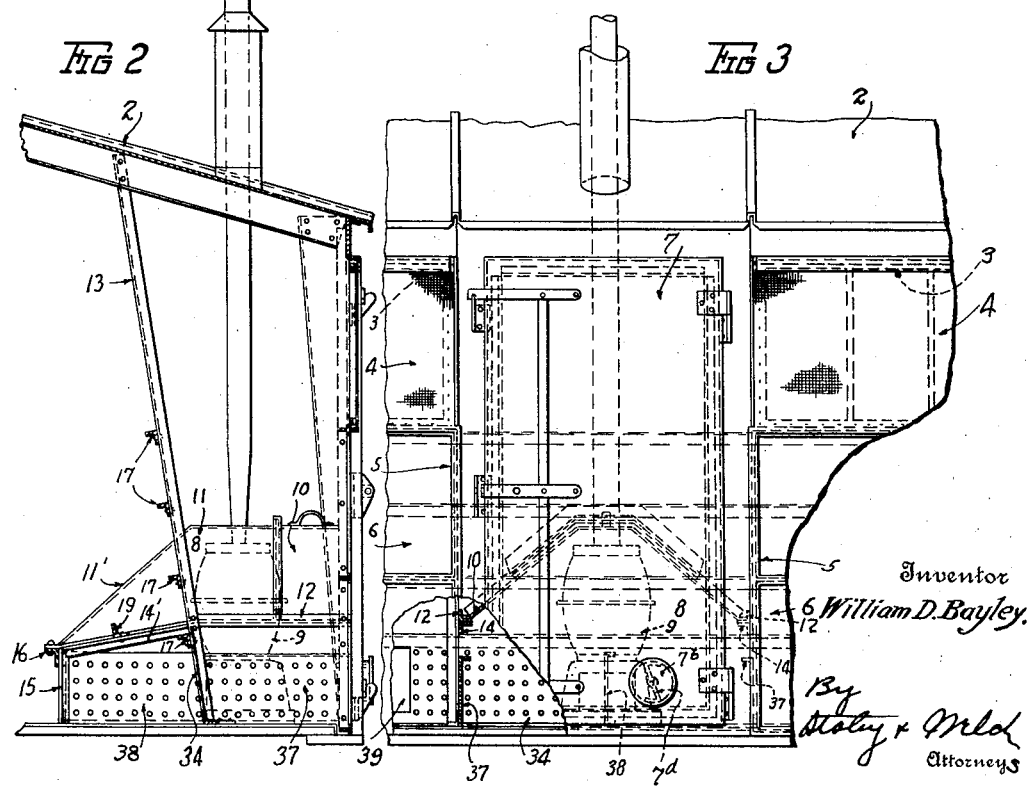

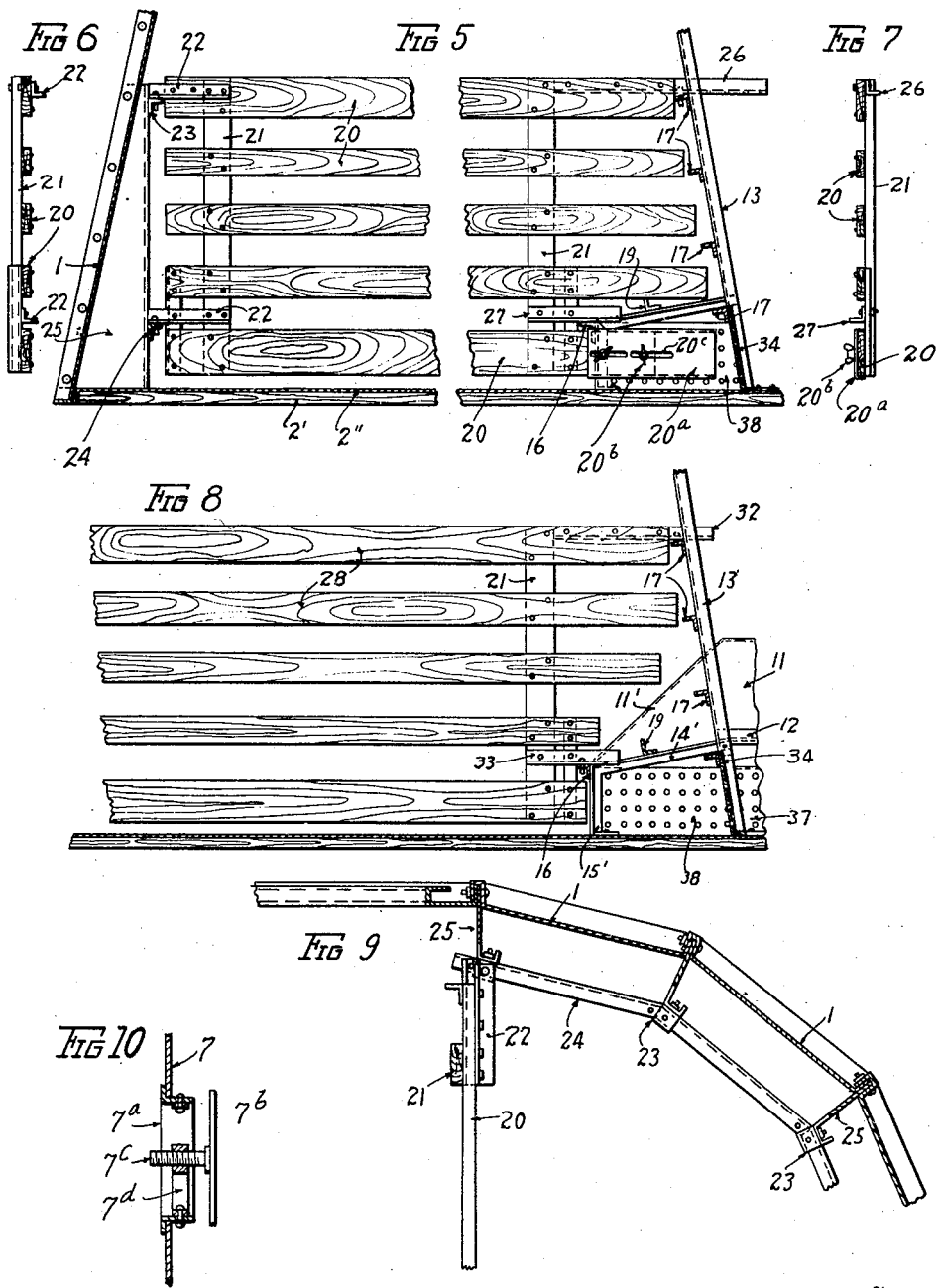

Sept. 27, 1932.   W. D. BAYLEY   1,879,781
FARROWING HOUSE
Filed Jan. 3, 1928   3 Sheets-Sheet 3
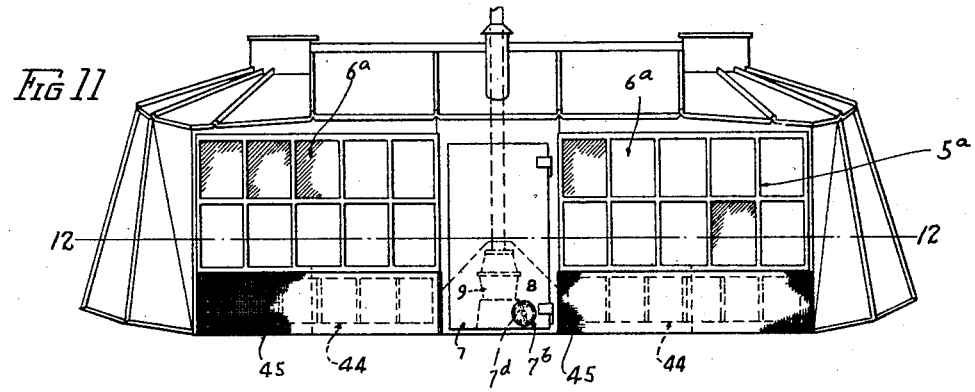
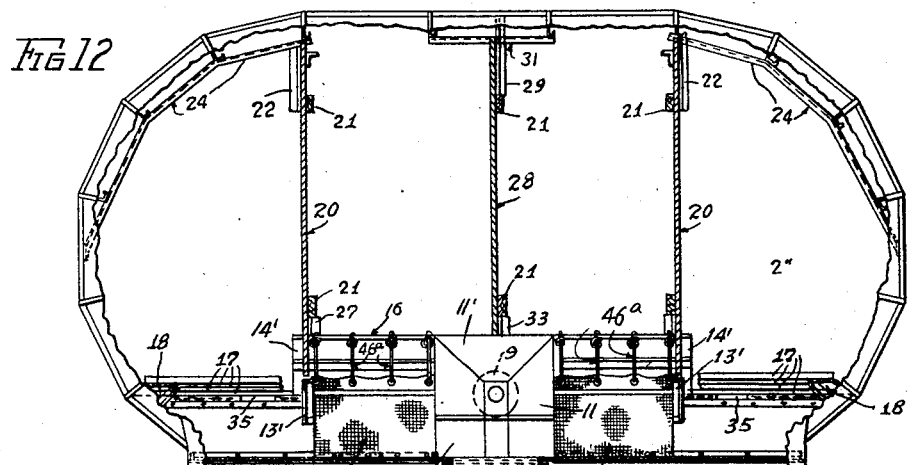
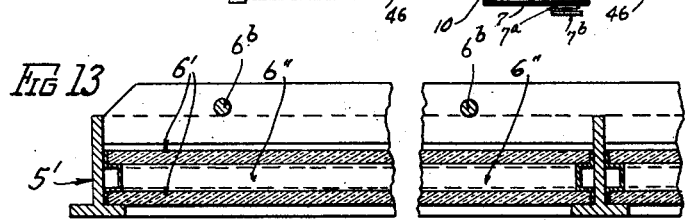
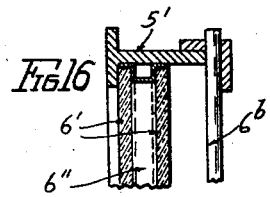
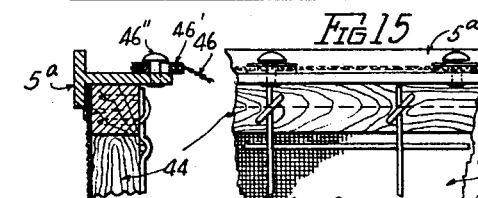
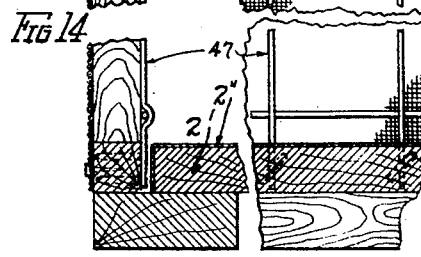
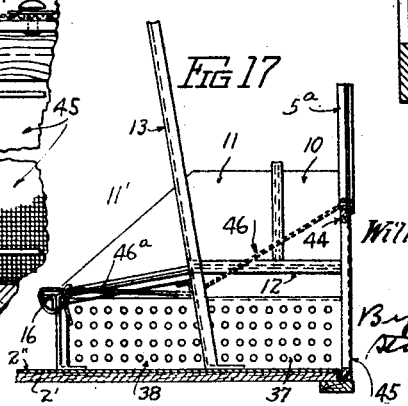

Patented Sept. 27, 1932

1,879,781

UNITED STATES PATENT OFFICE

WILLIAM D. BAYLEY, OF SPRINGFIELD, OHIO

FARROWING HOUSE

Application filed January 3, 1928. Serial No. 244,188.

This invention relates to improvements in farrowing houses, it more particularly relating to the arrangement of the pens and nursery compartments for the sows and litter of pigs in connection with means for supplying artificial heat from a common source to all of the pens and compartments and providing for utilizing both the heat and light of the sun.

One object of my invention is to provide a house of the character described having the pens and nursery compartments arranged to the best advantage for furnishing ample room for the sows and their pigs.

A further object of the invention is to provide a heating chamber for the house so arranged that it will communicate with all of the nursery compartments for the pigs and at the same time permit ready and convenient access to the heater contained therein.

A further object of the invention is to provide for so separating the nursery compartments from the sow pens as to exclude the sows from the nursery compartments and thereby amply protect the pigs in the nursery compartments from injury.

A further object of my invention is to provide a structure provided with a window for the admission of the light and heat of the sun to the interior of the structure generally and to also provide a window associated with the low nursery compartments of a nature to admit the ultra-violet rays of sunlight to such nursery compartments.

A further object of the invention is to provide a window for the nursey compartment so constructed as to insure maximum warmth for the young animals in the compartments but at the same time admitting the heat and light rays of the sun to such compartments.

Further objects of the invention will appear from the accompanying drawings, description and claims.

In the accompanying drawings:

Fig. 1 is a plan view of a house embodying my improvements, the major portion of the roof and side wall being broken away.

Fig. 2 is a section on the line 2—2 of Fig. 1.

Fig. 3 is an elevation of the forward side of a portion of the structure.

Fig. 4 is a detail of a portion of one of the side walls and a portion of one of the nursery compartment partitions.

Fig. 5 is a side elevation of one of the pen end partitions and its supports.

Fig. 6 is an end view of the same.

Fig. 7 is a view of the opposite end of the same.

Fig. 8 is a side elevation of a portion of the intermediate pen partition and one of the nursery compartments.

Fig. 9 is an enlarged sectional view of a portion of the wall of the housing showing a portion of one of the guard rails and also a portion of one of the end partitions.

Fig. 10 is an enlarged sectional view of a portion of the door showing the means of controlling inflow of fresh air.

Fig. 11 is a front elevation showing a modification of the front wall of the structure.

Fig. 12 is a transverse section on line 12—12 of Fig. 11.

Fig. 13 is a detail in transverse section showing a modification in the form of the window frame employed.

Fig. 14 is a vertical section through a portion of one of the window frames for one of the nursery compartments.

Fig. 15 is a side elevation of a portion of the same.

Fig. 16 is a vertical section showing a modification in the form of windows employed.

Fig. 17 is an end view showing canvas canopy over runway adjacent windows.

Referring first to Figs. 1 to 10 inclusive of the drawings, 1 represents the side walls of the structure, 2 the roof, constructed in the present case of sheet metal, one side however being enclosed by frames 3 covered with glass cloth 4 or the like, and metal sashes 5 having panes of glass 6. In Fig. 13 is shown a modification in which the lower portion of each of the metal sashes indicated at 5' in this figure is provided with double panes of glass 6' with an air space 6'' therebetween to insure greater warmth to the lower part of the structure in which nursery compartments, hereinafter to be described, are located. A series of vertical bars 6ᵇ are secured to the inner side of the sash to protect the panes of glass. A floor formed of wooden plank 2' is preferably covered with sheet metal 2''. Between the frames and sashes is located a door 7 which furnishes access to a heating compartment 8 having a stove 9 shown in the present case as a stove of the coal burning type provided with a canopy formed in two sections 10 and 11, section 10 being provided with a handle by which it may be readily raised to permit access to be had to the stove. The other section 11 has an extension 11' for a purpose to be explained.

Provision is made for supplying fresh air to the heating chamber through an opening in the door 7 formed by a thimble $7^a$ (Fig. 10 for detail), and a damper $7^b$ is provided for regulating the amount of fresh air so supplied. This damper has a threaded stem $7^c$ threaded in a bridge piece $7^d$ which extends across the thimble, the damper being screwed in or out to furnish the proper amount of air.

The canopy sections have their lower edges resting upon bars 12 of angle iron which in turn are supported by the frame of the front wall and by upwardly projecting supports 13 which extend from the floor to the roof with their upper and lower end suitably secured in position. Additional supports 14 of angle iron are also provided for the extension 11' of the canopy section 11, these supports 14 extending from the vertical supports 13 to inner short vertical supports 15 having a top rail 16, the ends of which have vertical supports 15'.

In addition to the two vertical supports 13 there are provided two other similar supports 13', these vertical supports 13 and 13' having secured thereto longitudinal rails 17 to form a fence. These rails are extended for substantially the full length of the house and their ends are connected to sheet metal strips 18 each of which has its inner edge bent as indicated at 18' in Fig. 4, which bent edge is secured within the seam of two of the side wall members 1.

In addition to the supporting members 14, the end of the rail 16 is connected to one of the rails 17 by angle iron members 14' and a longitudinal guard rail of angle iron 19 extends from each of the members 14 to each of the members 14'.

In the present structure four hog pens are provided formed by three partitions. Each of the end partitions consists of a series of wooden bars 20, connected by vertical battens 21, which partitions extend across the structure from the fence to the rear side thereof. The rear end of each of these partitions has connected therewith two angle iron plates 22, the upper one of which is connected with an angle iron knee 23 and the lower one with an angle iron guard rail 24. The knee is connected to one of a series of triangular shaped ribs 25 which forms a part of the wall structure, each of these ribs being constructed of sheet metal with one of its edges secured between the seams of the wall plates 1. The guard rail 24 is extended around a portion of each end of the structure and is likewise connected with these ribs 25. The inner end of the upper bar of each of the partitions has an angle-shaped metallic bar 26 connected therewith and is secured to the uppermost fence rail 17. The inner end of the partition also has a further support on the rail 16 by providing the inner batten 21 with an angle iron bar 27 which rests upon and is secured to the bar 16.

The intermediate partition consists of a series of wooden bars 28 connected by vertical battens 21, and is supported in position in a similar manner to the end partitions. Secured to the outer end of the upper bar 28 is an angle bar 29 which is in turn secured to an angle plate 30 fastened to one of the wall sheets. The lower end is secured to a short guard rail 31 in a manner similar to that described in connection with the end partition. The inner end of the intermediate partition has angle bars 32 and 33 which rest upon and are secured to the top rail 17 and rail 16 respectively.

Secured to the outer side of the lower rail 17 is a perforated partition formed of sheet metal 34 which closes the entire space between the lower rail 17 and the floor excepting for doors 35 formed in the partition. This partition forms a nursery compartment 36 on each side of the heating compartment, which nursery compartment communicates with the end pens through the doors 35. The inner end of each of these nursery compartments is separated from the heating chamber by a similarly formed perforated partition 37.

Besides the nursery compartments 36 there is also a nursery compartment which communicates with each of the inner pens, the outer side of each of which is formed by the partition 34 and the inner side of the vertical bars 15 and 15'; the tops of these inner nursery compartments being protected by the guard bars 19 located on the cross bars 14 and 14'. These two inner nusery compartments are separated by a perforated partition 38 which is connected to the rail 16, to the floor and to the partition 34, and the lower bars of the end pen partitions close to the outer ends of these inner nursery compartments.

Also formed in the partition 34 are additional openings 39 each of which may form a communication between one of the inner nursery compartments and one of the outer nursery compartments. A door (not shown) is usually provided for each of these openings 39 so as to keep the inner and outer nursery compartments separated.

By this arrangement it will be seen that a series of sow pens are provided of ample width throughout their length and there is also provided for each sow pen a nursery compartment for the small pigs each of which is separated from its corresponding pen in a way to protect the pigs while in the nursery compartment. It will also be seen that each nursery compartment communicates with a common heating chamber. By reason of the location of the nursery compartments for the inner pens, and also due to the fact that a portion of these nursery compartments are covered by the canopy extension 11' these inner nursery compartments will be the warmer so far as artificial heat is concerned, while the outer nursery compartments will have greater advantage in sunlight and heat of the sun. After the pigs have reached a certain age, the doors closing the openings 39 may be removed so that all of the pigs may have access to either an inner or outer nursery compartment. It will also be seen that by reason of the location of the heating chamber access may be readily had thereto for the purpose of replenishing fuel, removing ashes and so forth.

If desired, the end partitions may be moved to the position shown in dotted lines in Fig. 1 to increase the size of the inner pen to accommodate sows of different sizes. This may be readily accomplished by removing the fastening devices which secure each of the partitions to the ribs 25 and rails 16 and 17, and then securing the partitions to other ribs and to different positions on the rails 16 and 17 which are provided with a series of bolt holes for the purpose. When this adjustment is effected it is necessary to extend the lower rail 20 of the partition in order that this lower rail may continue to close the end of the inner nursery compartments associated therewith and to accomplish this the rail is provided with an adjustable extension 20ª of metal which is fastened to the rail by bolts having thumb nuts 20ᵇ, the rails projecting through slotted openings 20ᶜ in the rail.

The intermediate partition may also be moved to different positions by changing its connections with the plate 30 and rail 31 at its outer end and with the rails 16 and 17 at the inner end.

There is a door for each pen located in the wall of the structure, these doors being indicated at 40, 41, 42 and 43.

In Fig. 11 there is illustrated an arrangement in the front wall structure for the admission of the ultra-violet rays of the sun to the forward nursery compartment. In this figure the frames 5ª provided with ordinary panes of glass 6ª are provided for the admission of the heat and light of the sun to the structure generally while coincident with the forward nursery compartments are located sashes 44 covered with material 45 of a character which will admit the ultra-violet rays of the sun to these nursery compartments, this material being of any well known character. In this arrangement the tops of the outer nursery compartments are covered with canvas strips 46 or other suitable material as indicated in Fig. 12, Fig. 14 and Fig. 17. The upper edge of each canvas strip is secured to the sash frame 5ª by eyelets 46' hooked loosely over rivets 46'' (Fig. 14) while the lower edges of each of these canvas strips are tied to the rail 16 by ropes 46ª as indicated in Fig. 12. Also secured to the inner side of each of the frames 44 is a portion of fencing 47 to act as guards to keep the young animals from the window frames and their coverings. The admission of the ultra-violet rays of the sun to the young pigs serves to promote their growth and contributes to their health. This modification is otherwise the same as shown in Figs. 1 to 10 inclusive.

Having thus described my invention, I claim:

1. In a farrowing house, an enclosing structure, a rail fence in said structure adjacent one wall thereof, partitions extending from said fence to the opposite walls of said structure dividing said structure into pens, a partition closing the space between the lower rail of said fence and the floor of said structure to form nursery compartments on the outside of said fence which communicate with the end pens, rails located on the inner side of said fence to form nursery compartments communicating with the inner pens, a heating chamber common to all of said nursery compartments and separated therefrom by foraminous partitions, and a heater in said heating chamber, said heating chamber being accessible from the exterior of said house.

2. In a farrowing house, an enclosing structure, a series of partitions forming separate transversely arranged side-by-side pens in said structure, a separate nursery compartment associated with each pen, nursery compartments of adjacent pens being in overlapping relation, a common heating chamber with which all of said nursery compartments communicate, said heating chamber being located adjacent the wall of said structure, a heater in said chamber, and a canopy carried about said heater overhanging at least a part of said nursery compartments.

3. In a farrowing house, an enclosing structure, a series of cross partitions for separate transversely arranged side-by-side pens in said structure, two outer nursery compartments one for each end pen, two inner nursery compartments one for each inner pen, partitions separating said nursery compartments, with each outer compartment overlapping an inner compartment, a heating chamber arranged centrally the length of said structure but at one side thereof and accessible from the exterior of said structure and foraminous partitions separating said heating chamber from each of said nursery compartments.

4. In a farrowing house, an enclosing structure, partitions forming a pen in said structure, one at least of said partitions being removably connected with said structure to permit it to be set in different positions, a nursery compartment communicating with said pen and the movable partition forming a closure for one end of said nursery compartment, and an adjustable extension on said partition, for the purpose specified.

5. In a farrowing house, an enclosing structure, a plurality of side-by-side pens for large animals in said structure, a nursery compartment for small animals for each pen and communicating therewith, a central heating compartment having a heater for said nursery compartments, some of said nursery compartments being arranged adjacent one wall of the structure and extending in each direction from said central heating compartment, the other nursery compartments being located between their corresponding pens and said first-mentioned nursery compartments; and windows in that wall of the structure adjacent said first-mentioned nursery compartments having material capable of admitting the ultraviolet rays of the sun, said windows being located close to the floor line of said structure so as to admit the rays directly into said nursery compartments.

6. A farrowing house, an enclosing structure, a plurality of pens for large animals in said structure, a nursery compartment for small animals for each pen and communicating therewith, a central heating compartment in communication with each of said nursery compartments, some of said nursery compartments being arranged adjacent one wall of the structure, with the other nursery compartments adapted to be put in communication therewith, and windows in that wall of the structure adjacent said nursery compartments having material capable of admitting the ultra violet rays of the sun, said windows being located close to the floor line of said structure so as to admit the rays directly into those nursery compartments arranged adjacent thereto.

7. In a farrowing house, an enclosing structure, a series of partitions forming separate side-by-side pens in said structure, a separate nursery compartment at the rear end of each pen, a common heating chamber in said structure with which all of said nursery compartments communicate, a portion of said nursery compartments being located adjacent an outer wall of said structure with the other nursery compartments in communication therewith, and low-down windows in said wall.

8. In a farrowing house, an enclosing structure, a series of partitions forming separate side-by-side pens in said structure, a separate nursery compartment at the rear end of each pen, said nursery compartments being arranged with some compartments in over-lapping relation with other compartments and with the over-lapping compartments in communication with each other, a common heating chamber with which all of said nursery compartments communicate, said heating chamber being located adjacent a wall of said structure and accessible through said wall from the outside of said structure, some of said nursery compartments being also located adjacent said wall and low-down windows in said wall admitting light to said last mentioned nursery compartments.

9. In a farrowing house, an enclosing structure, a series of partitions forming separate transvelsely-arranged side-by-side pens in said structure, a separate nursery compartment at the rear end of each pen, a common heating chamber in said structure with which all of said nursery compartments communicate, the nursery compartment for each of the end pens being extended along a wall of the structure to said heating chamber, the intermediate nursery compartments being in over-lapping relation with the first mentioned nursery compartments, and in communication therewith, and windows in said wall of said structure admitting light to those nursery compartments adjacent thereto.

10. In a farrowing house, an enclosing structure, a series of partitions forming end pens and a plurality of intermediate pens in said structure, a heating chamber substantially centrally arranged with relation to said pens at the rear thereof, a nursery compartment at the rear of each end pen extending along a wall of said structure to said heating chamber, a nursery compartment at the rear of each intermediate pen arranged along the inner sides of said first mentioned nursery compartments adapted to be put in communication therewith and also in communication with the heating chamber, and low down windows in said wall of said structure to admit sunlight to the nursery compartments which are arranged adjacent said wall.

In testimony whereof, I have hereunto set my hand this 23rd day of December, 1927.

WILLIAM D. BAYLEY.